United States Patent Office 3,435,022
Patented Mar. 25, 1969

3,435,022
PYRAZOLONE MONOAZO DYES CONTAINING INDOLE OR CARBAZOLE GROUPS
Jacques Voltz, Riehen, Switzerland, assignor to
J. R. Geigy A.G., Basel, Switzerland
No Drawing. Filed July 8, 1965, Ser. No. 470,602
Claims priority, application Switzerland, July 10, 1964,
9,045/64; July 7, 1965, 9,536/65
Int. Cl. C09b 29/38, 29/36
U.S. Cl. 260—147           10 Claims

ABSTRACT OF THE DISCLOSURE

Dyes are disclosed of the formulas

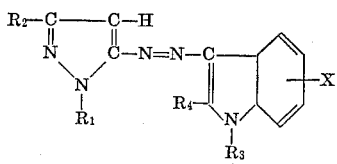

and

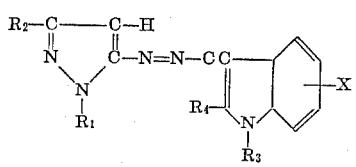

wherein:

$R_1$ represents hydrogen, lower alkyl, cyano-alkyl, hydroxy-alkyl lower alkoxy-alkyl the aforesaid substituted alkyl radicals having in each case from 2 to 4 carbon atoms in their alkyl moiety cyclohexyl, benzyl, phenyl, chlorophenyl, bromophenyl, nitro-phenyl, lower alkyl-phenyl, lower alkoxy-phenyl or lower alkanoylamino-phenyl, $R_2$ represents lower alkyl, phenyl or carbamyl, $R_3$ represents hydrogen, lower alkyl, cyano-lower alkyl, hydroxy-alkyl, lower alkoxy-alkyl, chloro-alkyl, bromo-alkyl, the aforesaid substituted alkyl radicals having in each case from 2 to 4 carbon atoms in their alkyl moiety, or benzyl, $R_4$ represents hydrogen, lower alkyl or phenyl, and X represents hydrogen, lower alkyl, chlorine, bromine or lower alkoxy.

These dyes are of the class known as disperse dyes, generally useful for the dyeing of hydrophobic fibers. Cationic dyes may be made from these disperse dyes. The cationic dyes have the same general configuration and are useful in the dyeing of acrylonitrile fibers. Also disclosed is a method of diazotizing the 5-amino pyrazoles set forth above using nitrosyl sulfuric acid in certain acidic media.

The present invention concerns new monoazo dyes, process for their production, their use for the dyeing of textile and the like materials made from hydrophobic fibers and, as industrial product, hydrophobic fiber materials dyed with these dyes.

In a first aspect, this invention relates to novel dyestuffs of the formulas

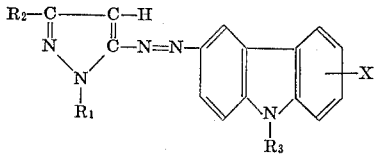

(IA)

and

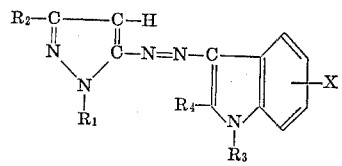

(IB)

in which formulas $R_1$ represents hydrogen, lower alkyl, cyano-alkyl, hydroxy-alkyl, lower alkoxy-alkyl, the aforesaid substituted alkyl radicals having in each case from 2 to 4 carbon atoms in their alkyl moiety, cyclohexyl, benzyl, phenyl, chlorophenyl, bromophenyl, nitro-phenyl, lower alkyl-phenyl, lower alkoxy-phenyl or lower alkanoyl-amino-phenyl, $R_2$ represents lower alkyl, phenyl or carbamyl, $R_3$ represents hydrogen, lower alkyl, cyano-lower alkyl, hydroxy-alkyl, lower alkoxy-alkyl, chloro-alkyl, bromo-alkyl, the aforesaid substituted alkyl radicals having in each case from 2 to 4 carbon atoms in their alkyl moiety, or benzyl, $R_4$ represents hydrogen, lower alkyl or phenyl, and X represents hydrogen, lower alkyl, chlorine, bromine or lower alkoxy.

which dyestuffs are useful as disperse dyes for the dyeing of textile materials consisting of hydrophobic fibers, especially polyester fibers such as cellulose di- or triacetate, acetyl cellulose, polyethylene glycol terephthalate and the like fibers. They are also useful as intermediates for making the cationic dyestuffs described below.

In a second aspect, this invention relates to novel cationic dyestuffs of the formulas

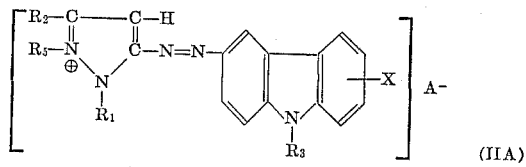

(IIA)

and

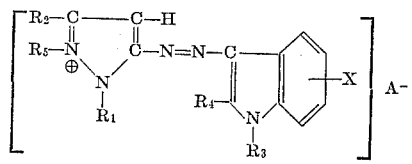

(IIB)

in which formulas $R_1$, $R_2$, $R_3$, $R_4$ and X have the same meanings as in Formulas IA and IB, and $R_5$ represents lower alkyl, carbamyl-lower alkyl, lower alkoxy-carbonyl-lower alkyl, cyano-alkyl wherein the alkyl moiety has from 2 to 4 carbon atoms, or benzyl, and $A^-$ represents the anion of an acid, which dyestuffs are useful in the dyeing of polymeric and copolymeric acrylonitrile fibers, in yellow to orange shades.

Their dyeings on these fibers are distinguished by a superior light fastness which is about 400 to 800% greater than the light fastness attainable on the same textile materials with structurally closest known cationic monoazo dyes containing similar coupling components and similar yellow to orange shades, while the light fastness of dyeings on the aforesaid fibers in the shades mentioned, with cationic dyes according to the invention is comparable to that hitherto attainable in dyeings of red to violet shades on the same materials, using known cationic monoazo dyes which contain sulfur besides nitrogen in heterocyclic rings of their diazo components.

More in detail, the new cationic dyes according to the invention, as defined in Formulas IIA and IIB, have good water solubility, particularly when in the form of salts of a strong inorganic acid or organic sulphonic acid. From aqueous, neutral or—advantageously—from a weakly acid solution, optionally in the presence of wetting agents having a dispersing action such as in the presence of condensation products of alkylene oxides with higher alkanols, they draw substantially to completely onto polymeric or copolymeric acrylonitrile fibers and produce yellow to orange dyeings on these materials having good fastness properties in wet media, such as fastness to washing, milling, sea water, perspiration, fastness to decatizing and, particularly, as mentioned above, excellent light fastness.

"Lower" used in this specification and the appended claims in connection with an aliphatic radical means that such radical has from 1 to 4 carbon atoms.

The formulas given above for the cationic dyestuffs according to the invention are used herein as representative electronic resonance formulas covering, for the sake of simplicity, all mesomeric limit formulas of these dyestuffs.

These cationic dyestuffs according to the invention are color salts of strong inorganic or organic acids, among which are mainly the chlorides, bromides, iodides, methosulfates, ethosulfates, bisulfates, benzene sulfonates or p-toluene sulfonates. If desired, also salts of other acids can be produced by double decomposition reaction, e.g. oxalates by the addition of oxalic acid. Double salts can also be produced, e.g. with the dyestuff halides and corresponding zinc or cadmium salts.

The new disperse dyestuffs acording to the invention are produced by diazotizing a 5-aminopyrazole of the formulas

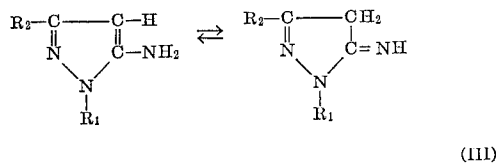

(III)

and coupling the resulting diazo compound with the corresponding carbazole which is capable of coupling in the p-position to the imino group or indole which is capable of coupling in the 3-position to the amino group and recovering the resulting monoazo dyestuff of Formula IA or IB.

$R_1$ and $R_2$ in Formulas III have the same meanings as in the preceding formulas.

The majority of starting materials of Formulas III are known or they can be produced by conventional methods, e.g. by reacting cyano-methyl ketones or their imines with hydrazines substituted corresponding to $R_1$.

The diazotization of the 5-aminopyrazoles of Formulas III is performed advantageously with nitrosyl sulfuric acid in concentrated inorganic oxygen acids such as in strong sulfuric acid of at least 50% $H_2SO_4$ content or in phosphoric acid or in concentrated organic carboxylic acids such as in formic acid, acetic acid (glacial acetic acid) or propionic acid. This diazotization with nitrosyl sulfuric acid represents a further aspect of the invention and affords very good yields, of 80% by weight and higher, calculated on the theoretical; this is very surprising when compared with the yields attained with the only known method described by E. Mohr in Journal pract. Chem. 90, pp. 509–546 (1914) which resulted, in the case of amines of Formulas III, in yield rates of less than 20%.

The carbazoles and indoles used as coupling components are well known or can be readily produced by conventional methods from the known ones.

The coupling of the diazonium compound of the 5-aminopyrazole of Formulas III with the coupling component to form the monoazo dyestuffs of Formulas IA or IB, respectively, is performed by known methods in and preferably at low temperatures.

The cationic dyestuffs according to the invention are obtained from the dyestuffs of Formulas IA and IB, respectively, by reacting the later with a reactive ester of an unsubstituted or non-ionogenically substituted alkanol with a strong inorganic or organic acid to form the corresponding cyclammonium compound of Formulas IIA or IIB.

Reactive alkanol esters with which the monoazo dyestuff of Formula IA or IB is reacted to form the corresponding cyclammonium compound of Formulas IIA or IIB are, for instance, the methyl, ethyl, n-propyl, n-butyl, cyanoethyl, or benzyl esters of hydrochloric acid, hydrobromic acid or hydroiodic acid, dimethyl sulfate or diethyl sulfate, the methyl and ethyl esters of benzene sulfonic acid or of p-toluene sulfonic acid, also alkyl sulfonic acid or of p-toluene sulfonic acid, also alkyl bromoacetates, the alkyl moiety of which has preferably 1 to 4 carbon atoms. Instead of certain substituted alkanol esters, also their preliminary stages can be used, e.g. instead of β-cyanoethyl chloride or β-carbamyl-ethyl chloride or corresponding bromides, acrylanitrile or acrylamide can be used in the presence of aqueous hydrochloric or hydrobromic acid.

The reaction of a monoazo dyestuff of Formula IA or IB with a reactive alkanol ester to form the corresponding cyclammonium compound of Formula IIA or IIB is performed by heating the two substances advantageously in an organic solvent which does not take part in the reaction. Suitable solvents are e.g. optionally halogenated or nitrated aromatic hydrocarbons such as toluene, xylene, halogen benzenes or nitrobenzenes, or optionally halogenated aliphatic hydrocarbons, e.g. trichloroethylene or trichloroethane.

The following non-limitative examples illustrate the invention. The temperatures are given in degrees centigrade.

Example 1

Nitrosyl sulfuric acid, corresponding to 3.45 g. of sodium nitrite, is added dropwise while stirring to the solution, cooled to —5 to 0°, of 8.6 g. of 1-phenyl-3-methyl-5-aminopyrazole in 60% sulfuric acid. The reaction mixture is then left to stand for another hour at the same temperature. The solution of the diazonium salt so obtained is combined with a fine suspension of 6.6 g. of 2-methylindole, 25 g. of methanol, 250 g. of water and 350 g. of ice whereupon the azo dyestuff begins to precipitate immediately. The pH of the coupling mass is adjusted to 4 by the dropwise addition of sodium hydroxide solution, the yellow monoazo dyestuff, which is difficultly soluble in water, is filtered off and washed with a large amount of water.

A preparation produced by milling with a condensation product of naphthalene-2-sulfonic acid and formaldehyde, dyes polyglycol terephthalate fibers such as "Tergal" from an aqueous dispersion, optionally in the presence of a carrier such as o-phenylphenol, in pure yellow shades.

2.6 g. of dimethyl sulfate in 10 g. of chlorobenzene are poured at 110–120° into a solution of 6.3 g. of the azo dyestuff so obtained, which has been dried in vacuo, in 200 g. of chlorobenzene and the reaction mixture is kept at 110–120° for 1 hour. The mixture is cooled, 200 g. of water are added and the organic solvent is removed by steam distillation. The aqueous solution of the basic dyestuff is clarified with a small amount of animal charcoal and the yellow color salt of the formula

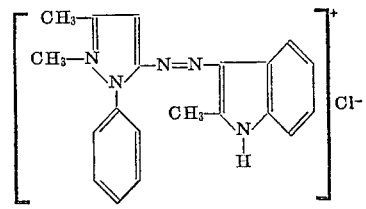

is precipitated therefrom by adding sodium chloride. By precipitation of the color salt with 3 g. of zinc chloride and sodium chloride, the corresponding zinc chloride double salt is obtained.

It dissolves in water with a yellowish orange color and dyes polyacrylonitrile fibers from an acetic acid bath in vivid yellow shades which have excellent light fastness.

Dyestuffs having similar properties are obtained if, as coupling components, instead of 6.6 g. of 2-methylindole, equivalent amounts of one of the amines given in the following table is used and the above procedure is followed

TABLE 1

| Example No. | Diazo component | Coupling component | Shade on polyacrylonitrile fibers |
|---|---|---|---|
| 2 | 1-phenyl-3-methyl-5-aminopyrazole | 9.7 g. 2-phenylindole | Yellowish orange. |
| 3 | do | 7.3 g. 1,2-dimethylindole | Yellow. |
| 4 | do | 5.9 g. indole | Do. |
| 5 | do | 9.3 g. 1-cyanethyl-2-methylindole | Do. |
| 6 | do | 10.4 g. 1-methyl-2-phenylindole | Orange. |
| 7 | do | 7.3 g. 2,5-dimethylindole | Yellow. |
| 8 | do | 8.2 g. 2-methyl-5-methoxyindole | Yellowish orange. |
| 9 | do | 11.6 g. 2-phenyl-5-chloroindole | Do. |

Example 10

8.9 g. of 1-cyclohexyl-3-methyl-5-aminopyrazole are dissolved in 30 g. of concentrated sulfuric acid and the solution is diazotized at −5° with nitrosyl sulfuric acid, corresponding to 3.45 g. of sodium nitrite. The diazo solution is diluted with 500 g. of ice and a suspension of 9.7 g. of 2-phenylindole in a mixture of 50 g. of methanol and 200 g. of ice is dropped in at 0°. The mineral acid is buffered with sodium hydroxide solution until the pH is 4, and then the monoazo dyestuff is filtered off under suction, washed with a large amount of water and dried in vacuum.

After milling with a condensation product of naphthalene-2-sulfonic acid and formaldehyde, the dyestuff obtained dyes acetyl cellulose fibers in pure yellow shades from an aqueous dispersion.

At 110°, 1.4 g. of dimethyl sulfate in 10 g. of chlorobenzene are added dropwise to a solution of 3.8 g. of this monoazo dyestuff in 100 g. of chlorobenzene. The yellow solution is kept for 1 hour at 110°. The color changes to orange and the dyestuff precipitates as an oil. After cooling, the solvent is decanted and the resin which remains is washed with a little benzene. To further purify, the dyestuff is dissolved in 250 g. of hot water, the solution is clarified with a little animal charcoal and the dyestuff is precipitated therefrom with sodium chloride and filtered off. The color salt is a brown powder which dissolves in water with an orange color. It corresponds to the formula

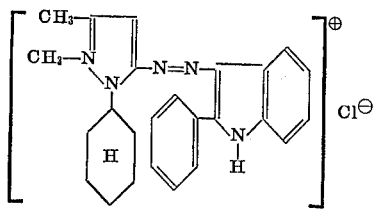

It dyes polyacrylonitrile fibers from an acetic acid bath in yellowish orange shades which have excellent fastness to light and decatizing.

Other inert organic solvents such as xylene, toluene, o-dichlorobenzene, tetraline, trichloroethylene or tetrachloroethane can also be used instead of chlorobenzene.

Dyestuffs having similar properties are obtained if, instead of 8.9 g. of 1-cyclohexyl-3-methyl-5-aminopyrazole in the above example, equivalent amounts of one of the diazo components given in the following table is used and otherwise the procedure described in the example is followed.

TABLE 2

| Example No. | Diazo component | Coupling component | Shade on polyacrylonitrile fibers |
|---|---|---|---|
| 11 | 5.51 g. 1,3-dimethyl-5-aminopyrazole | 2-methylindole | Yellow. |
| 12 | 6.15 g. 1-ethyl-3-methyl-5-aminopyrazole | do | Do. |
| 13 | 6.95 g. 1-isopropyl-3-methyl-5-aminopyrazole | do | Do. |
| 14 | 9.3 g. 1-(3'-methylphenyl)-3-methyl-5-aminopyrazole | do | Do. |
| 15 | 9.3 g. 1-(4'-methylphenyl)-3-methyl-5-aminopyrazole | do | Do. |
| 16 | 10.38 g. 1-(3'-chlorophenyl)-3-methyl-5-aminopyrazole | do | Do. |
| 17 | 10.65 g. 1-(3'-methoxyphenyl)-3-methyl-5-aminopyrazole | do | Do. |
| 18 | 12.55 g. 1-(3'-methylsulfonyl)-3-methyl-5-aminopyrazole | do | Do. |
| 19 | 9.35 g. 1-phenyl-3-ethyl-5-aminopyrazole | do | Do. |
| 20 | 10.9 g. 1-(4'-nitrophenyl)-3-methyl-5-aminopyrazole | do | Do. |
| 21 | 13.1 g. 1-(4'-bromophenyl)-3-methyl-5-aminopyrazole | do | Do. |
| 22 | 11.8 g. 1,3-diphenyl-5-aminopyrazole | do | Do. |
| 23 | 6.8 g. 1-(2'-cyanoethyl)-3-methyl-5-aminopyrazole | do | Do. |
| 24 | 7.1 g. 1-(2'-hydroxyethyl)-3-methyl-5-aminopyrazole | do | Do. |
| 25 | 7.8 g. 1-(2'-methoxyethyl)-3-methyl-5-aminopyrazole | do | Do. |
| 26 | 10.1 g. 1-phenyl-3-carbamyl-5-aminopyrazole | do | Do. |
| 27 | 11.5 g. 1-(3'-acetylaminophenyl)-3-methyl-5-aminopyrazole | do | Do. |

EXAMPLE 28

A solution of 10.38 g. of 1-(3'-chlorophenyl)-3-methyl-5-aminopyrazole in 100 g. of glacial acetic acid and 10 g. of sulfuric acid is diazotized with nitrosyl sulfuric acid, corresponding to a content of 3.45 g. of sodium nitrite. The solution of 7.3 g. of 1,2-dimethylindole in 50 g. of glacial acetic acid is added dropwise to this diazo solution at −10°. The mixture is stirred for 2 hours, and then 300 g. of water are added in portions and the mineral acid reaction is buffered by the dropwise addition of an aqueous solution of sodium acetate. The yellow dyestuff is then filtered off and washed with a large amount of water and dried. A preparation produced by milling with a condensation product of naphthalene-2-sulfonic acid and formaldehyde dyes polyglycol terephthalate fibers such as "Terylene" from aqueous dispersions, optionally in the presence of carriers, in yellow shades 3.7 g. of this dyestuff are then converted as described in Example 1 into the water soluble dyestuff, dimethyl sulfate being used with toluene as solvent. The color salt is isolated and purified as described in Example 1 and finally it is obtained as an orange powder which dissolves in water with a yellow color. Its composition corresponds to the formula.

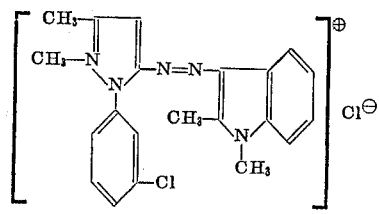

and the corresponding zinc chloride double salt. The dyestuff dyes polyacrylonitrile fibers from an acetic acid bath in yellow shades which have excellent wet and light fastness properties.

Example 29

10.65 g. of 1-(3'-methoxyphenyl)-3-methyl-5-aminopyrazole are diazotized as described in Example 1 and coupled with 5.9 g. of indole using acetic acid as solvent. The yellow monoazo dyestuff is precipitated by the careful dilution of the reaction mixture with 300 g. of water, isolated and dried.

3.2 g. of the dry dyestuff are dissolved in 100 g. of chlorobenzene and the solution is ethylated with 1.7 g. of diethyl sulfate. The basic dyestuff is worked up as described in Example 1. The color salt dissolves in water with a yellow color and dyes polyacrylonitrile fibers from an acetic acid bath in yellow shades.

If, instead of 1-(3'-methoxyphenyl)-3-methyl-5-aminopyrazole and diethyl sulfate, the equivalent amounts of the diazotizing components and alkylating agents given in the following Table 3 are used then, with otherwise the same procedure as given in the example, color salts having similar properties are obtained.

TABLE 3

| Example No. | Diazotizing component | Alkylating agent | Shade on polyacrylonitrile fibers |
|---|---|---|---|
| 30 | 1-phenyl-3-methyl-5-aminopyrazole. | Diethyl sulfate | Yellow. |
| 31 | do | p-Toluene sulfonic acid methyl ester. | Do. |
| 32 | 1,3-dimethyl-5-aminopyrazole. | Benzyl bromide | Do. |
| 33 | 1-methyl-3-methyl-5-aminopyrazole. | do | Do. |
| 34 | 1,3-dimethyl-5-aminopyrazole. | Bromoacetic acid ethyl ester. | Do. |
| 35 | do | Bromoacetic acid amide. | Do. |
| 36 | do | Bromoacetic acid methyl ester. | Do. |
| 37 | 1-cyclohexyl-3-methyl-5-aminopyrazole. | p-Toluene sulfonic acid methyl ester. | Do. |
| 38 | do | p-Toluene sulfonic acid ethyl ester. | Do. |
| 39 | do | 2-bromopropionitrile | Do. |

Example 40

8.6 g. of 1-phenyl-3-methyl-5-aminopyrazole are diazotized as described in Example 1. The solution of the diazonium salt so obtained is combined with the solution of 8.4 g. of carbazole in 100 g. of dioxan. After the addition of 400 g. of ice the azo dyestuff begins to precipitate. The pH of the coupling mass is adjusted to 3 to 4 by the dropwise addition of sodium hydroxide solution. The yellow monoazo dyestuff, which is difficultly soluble in water, is filtered off and washed with a large amount of water. A preparation produced by milling with a condensation product of naphthalene-2-sulfonic acid and formaldehyde dyes polyglycol terephthalate fibers such as "Dacron" from aqueous dispersion, optionally in the presence of carriers, in yellow shades.

2.6 g. of dimethyl sulfate in 10 g. of chlorobenzene are added at 110–120° to a solution of a 7.0 g. of the azodyestuff so obtained, which has been dried in vacuo, in 150 g. of chlorobenzene and the reaction mixture is kept for 1 hour at 110–120°. The mixture is cooled, 200 g. of water are added and the organic solvent is removed by steam distillation. The aqueous solution of the basic dyestuff is clarified and finally the color salt is precipitated with sodium chloride. The yellowish orange color salt of the formula

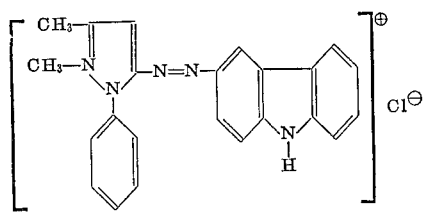

dissolves in water with a yellowish orange color and dyes polyacrylonitrile fibers from an acetic acid bath in yellowish orange shades which have excellent light fastness.

Dyestuffs having similar properties are obtained if, as coupling components instead of 8.4 g. of carbazole, equivalent amounts of one of the carbazole derivatives in the following table is used and the above procedure is followed.

TABLE 4

| Example No. | Diazo component | Coupling component | Shade on polyacrylonitrile fibers |
|---|---|---|---|
| 41 | 1-phenyl-3-methyl-5-aminopyrazole. | N-ethyl-carbazole | Yellowish orange. |
| 42 | do | N-(2'-cyanethyl)-carbazole. | Do. |
| 43 | do | N-(2'-hydroxyethyl)-carbazole. | Do. |
| 44 | do | N-(2'-methoxyethyl)-carbazole. | Do. |
| 45 | do | N-(2'-chloroethyl)-carbazole. | Do. |
| 46 | 1,3-dimethyl-5-aminopyrazole. | N-benzyl-carbazole | Do. |
| 47 | 1-phenyl-3-methyl-5-aminopyrazole. | N-methyl-4-chloro-carbazole. | Do. |
| 48 | do | N-methyl-4-bromo-carbazole. | Do. |
| 49 | 1-cyclohexyl-3-methyl-5-aminopyrazole. | Carbazole | Do. |
| 50 | 1-isopropyl-3-methyl-5-aminopyrazole. | do | Do. |
| 51 | 1-(3'-methyl-phenyl)-3-methyl-5-aminopyrazole. | do | Do. |
| 52 | 1-(4'-bromophenyl)-3-methyl-5-aminopyrazole. | N-ethyl-carbazole | Do. |

Example 53

2 parts of the dyestuff obtained according to Example 1 are dispersed in 4000 parts of water. 12 parts of the sodium salt of o-phenylphenol as carrier and also 12 parts of diammonium phosphate are added to this dispersion and 100 parts of polyglycol terephthalate yarn are dyed for 1½ hours at 95–98°. The dyeing is rinsed and aftertreated with dilute sodium hydroxide solution and a dispersing agent.

In this way a yellow dyeing which is fast to washing and sublimation is obtained.

If in the above example, the 100 parts of polyglycol terephthalate yarn are replaced by 100 parts of cellulose triacetate fabric and the goods are dyed under the conditions given and then rinsed with water, a yellow dyeing is obtained which is distinguished by a high degree of fastness to washing and sublimation.

Example 54

0.5 g. of the basic dyestuff obtained according to Example 1 are slurried with 0.5 g. of 80% acetic acid and dissolved by the addition of 4000 g. of hot water. Another 1 g. of 80% acetic acid, 2 g. of sodium acetate and 4 g. of a condensation product of olein alcohol and 15 mols of ethylene oxide are added to this solution and 100 g. of polyacrylonitrile fibers are introduced into this bath. The bath is heated to 90° within 30 minutes, kept for 10 minutes at this temperature and the fibers are then dyed at the boil for 1 hour. The dyebath is almost completely exhausted. The fibers are then soaped for 15 minutes at 80° in 5000 g. of water with the addition of 6 g. of the sodium salt of oleic acid-N-methyl-N-β-sulfonic acid ethylamide, rinsed and dried. The polyacrylonitrile fibers are dyed in pure yellow shades which have excellent fastness to washing, light and decatizing.

Yellowish orange dyeings having similar properties are obtained if, instead of 0.5 g. of the basic dyestuff of Example 1, 0.5 g. of the color salt of Example 39 are used and the above procedure is followed.

I claim:
1. A member selected from the group consisting of dyestuffs of the formulae:

[structural formulas]

and

[structural formulas]

wherein
$R_1$ represents hydrogen, lower alkyl, cyano-alkyl, hydroxyalkyl, lower alkoxy-alkyl, the aforesaid substituted alkyl radicals having in each case from 2 to 4 carbon atoms in their alkyl moiety, cyclohexyl, benzyl, phenyl, chlorophenyl, bromophenyl, nitrophenyl, lower alkyl-phenyl, lower alkoxy-phenyl or lower alkanoylamino-phenyl,
$R_2$ represents lower alkyl, phenyl or carbamyl,
$R_3$ represents hydrogen, lower alkyl, cyano-lower alkyl, hydroxy-alkyl, lower alkoxy-alkyl, chloro-alkyl, bromoalkyl, the aforesaid substituted alkyl radicals having in each case from 2 to 4 carbon atoms in their alkyl moiety, or benzyl,
$R_4$ represents hydrogen, lower alkyl or phenyl,
X represents hydrogen, lower alkyl, chlorine, bromine or lower alkoxy,
$R_5$ represents lower alkyl, carbamyl-lower alkyl, lower alkoxy-carbonyl-lower alkyl, cyano-alkyl, wherein the alkyl moiety has from 2 to 4 carbon atoms, or benzyl, and
$A^-$ represents the anion of an acid.

2. A cationic dyestuff of the formula

[structural formula]

wherein
$R_1$ represents hydrogen, lower alkyl, cyano-alkyl, hydroxy-alkyl, lower alkoxy-alkyl, the aforesaid substituted alkyl radicals having in each case from 2 to 4 carbon atoms in their alkyl moiety, cyclohexyl, benzyl, phenyl, chlorophenyl, bromophenyl, nitro-phenyl, lower alkyl-phenyl, lower alkoxy-phenyl or lower alkanoylamino-phenyl,
$R_2$ represents lower alkyl, phenyl or carbamyl,
$R_3$ represents hydrogen, lower alkyl, cyano-lower alkyl, hydroxy-alkyl, lower alkoxy-alkyl, chloro-alkyl, bromoalkyl, the aforesaid substituted alkyl radicals having in each case from 2 to 4 carbon atoms in their alkyl moiety, or benzyl,
$R_5$ represents lower alkyl, carbamyl-lower alkyl, lower alkoxy-carbonyl-lower alkyl, cyano-alkyl, wherein the alkyl moiety has from 2 to 4 carbon atoms, or benzyl,
X represents hydrogen, lower alkyl, chlorine, bromine or lower alkoxy, and
$A^-$ represents the anion of an acid.

3. The dyestuff of the formula

[structural formula]

4. A cationic dyestuff of the formula

[structural formula]

wherein
$R_1$ represents hydrogen, lower alkyl, cyano-alkyl, hydroxy-alkyl, lower alkoxy-alkyl, the aforesaid substituted alkyl radicals having in each case from 2 to 4 carbon atoms in their alkyl moiety, cyclohexyl, benzyl, phenyl, chlorophenyl, bromophenyl, nitro-phenyl, lower alkyl-phenyl, lower alkoxy-phenyl or lower alkanoylamino-phenyl,
$R_2$ represents lower alkyl, phenyl or carbamyl,
$R_3$ represents hydrogen, lower alkyl, cyano-lower alkyl, hydroxy-alkyl, lower alkoxy-alkyl, chloro-alkyl, bromoalkyl, the aforesaid substituted alkyl radicals having in each case from 2 to 4 carbon atoms in their alkyl moiety, or benzyl,
$R_4$ represents hydrogen, lower alkyl or phenyl,
$R_5$ represents lower alkyl, carbamyl-lower alkyl, lower alkoxy-carbonyl-lower alkyl, cyano-alkyl, wherein the alkyl moiety has from 2 to 4 carbon atoms, or benzyl,
X represents hydrogen, lower alkyl, chlorine, bromine or lower alkoxy, and
$A^-$ represents the anion of an acid.

5. A dyestuff of the formula

[structural formula]

6. A dyestuff of the formula

[structural formula]

7. A dyestuff of the formula

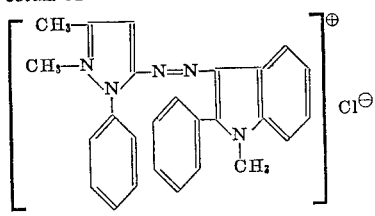

8. A dyestuff of the formula

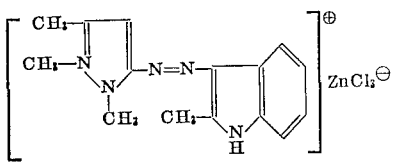

9. A disperse dyestuff of the formula

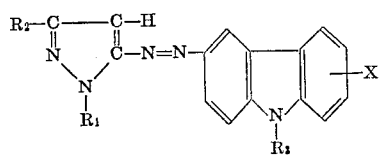

or

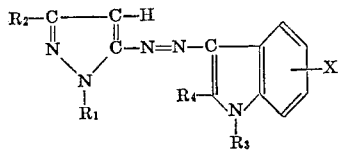

wherein $R_1$ represents hydrogen, lower alkyl, cyano-alkyl, hydroxy-alkyl, lower alkoxy-alkyl, the aforesaid substituted alkyl radicals having in each case from 2 to 4 carbon atoms in their alkyl moiety, cyclohexyl, benzyl, phenyl, chlorophenyl, bromophenyl, nitrophenyl, lower alkyl-phenyl, lower alkoxy-phenyl or lower alkanoylamino-phenyl, $R_2$ represents lower alkyl, phenyl, or carbamyl, $R_3$ represents hydrogen, lower alkyl, cyano-lower alkyl, hydroxy-alkyl, lower alkoxy-alkyl, chloro-alkyl, bromoalkyl, the aforesaid substituted alkyl radicals having in each case from 2 to 4 carbon atoms in their alkyl moiety, or benzyl, $R_4$ represents hydrogen, lower alkyl or phenyl, and X represents hydrogen, lower alkyl, chlorine, bromine or lower alkoxy.

10. The dyestuff of the formula

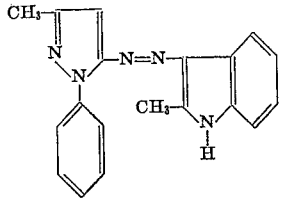

References Cited

UNITED STATES PATENTS

| | | | |
|---|---|---|---|
| 3,336,285 | 8/1967 | Towne et al. | 260—162 XR |
| 2,998,426 | 8/1961 | Dickinsen et al. | 260—162 XR |
| 3,255,173 | 6/1966 | Dehnert et al. | 260—165 XR |

OTHER REFERENCES

Saunders, "The Aromatic Diazo Compounds," 2nd Ed., pp. 10 to 15 (1949).

FLOYD D. HIGEL, *Primary Examiner.*

U.S. Cl. X.R.

8—4, 41, 42, 50; 117—138.8; 260—41, 162, 310, 315, 319.1, 326.5